Figure 1:
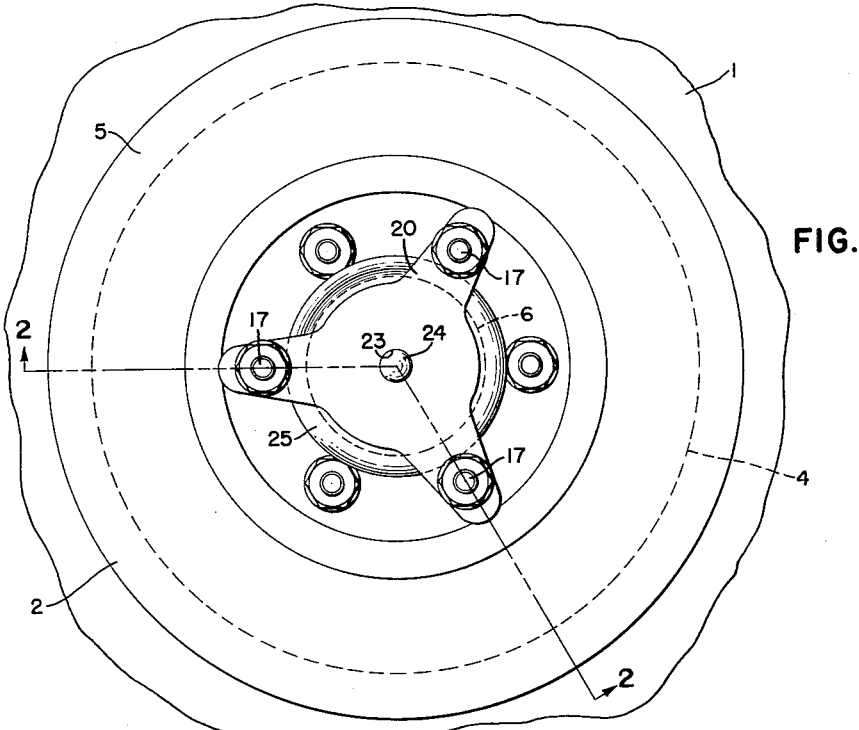

March 20, 1962 R. W. SUTTON ETAL 3,026,070
FUEL TANK FITTING
Filed July 7, 1958 2 Sheets-Sheet 1

INVENTOR.
JOHN T. REYNOLDS
ROBERT W. SUTTON
BY
P. L. Miller
ATTORNEY

INVENTOR.
JOHN T. REYNOLDS
ROBERT W. SUTTON

ATTORNEY

United States Patent Office 3,026,070
Patented Mar. 20, 1962

3,026,070
FUEL TANK FITTING
Robert W. Sutton, Akron, and John T. Reynolds, Tallmadge, Ohio, assignors to The Goodyear Tire & Rubber Company, Akron, Ohio, a corporation of Ohio
Filed July 7, 1958, Ser. No. 747,057
11 Claims. (Cl. 244—135)

This invention relates to fluid containers and more particularly to fittings for use with flexible fluid containers that are crash resistant in construction.

Much work has been done in recent years in the development of crash resistant flexible fluid containers or cells primarily for aircraft although applicable to other vehicles also. Such containers are constructed to absorb tremendous impacts without rupture or separation at the seams. The need for such a container is obvious, particularly if the contents are flammable or explosive and the effectiveness and safety of a container such as this is reduced greatly unless the various fittings and attachments used on the container are constructed so that they remain with the container and close the openings in the event the container is torn loose from its moorings under high impact loads. Normally the fittings function in the manner of the usual fittings. If the fittings or attachments are torn off or the openings remain open, the fuel in the container would spill out and create a potential fire or explosive situation irrespective of the tank construction.

The usual flexible container with the fittings attached is mounted in a rigid supporting structure and positioned therein by firmly attaching the fittings of the container to the supporting structure also. Filler necks, interconnectors, pumps, access doors, etc. are typical of the fittings attached to such containers and the supporting structure also. The attachment to the supporting structure accurately positions the container therein and positions the fitting and openings for easy access. In the event of high impact loads or stresses such as caused by a crash, it is desirable that the attachment to the supporting structure be released so that the container is released from the supporting structure and possibly the vehicle. The inertia of the fuel in the container in the event of a crash is tremendous and subjects the container to severe stresses and distortions which possibly would rupture the container if provisions were not made to release the container. In most fittings for flexible containers, the opening is clear in normal operations and means must be provided to close the openings in the event the container is released from its supporting structure. Therefore, it is an object of this invention to provide a fitting that positions a flexible container in a supporting structure but will release it when subjected to predetermined stresses or impacts.

Another object of the invention is to provide a fitting that is readily adaptable to standard flexible containers or fuel cell constructions.

A further object of the invention is to provide a fitting for flexible containers that is positive and foolproof in its action.

A still further object of the invention is to provide a fitting for flexible containers which does not interfere substantially with the normal function of the container opening but is activated to close the opening in the event the container is released from its supporting structure.

Another object of the invention is to provide a fitting that is of relative light weight and economical to manufacture and use.

Other objects and advantages of the product of the invention will become apparent as the detailed description thereof proceeds, the novel features, arrangements and combinations being clearly pointed out in the specification and in the claims thereunto appended.

Figure 2:
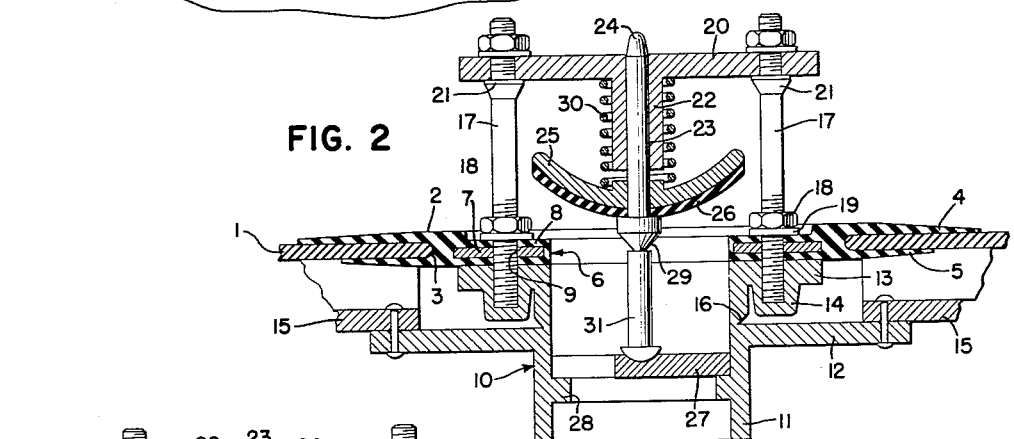
Figure 3:
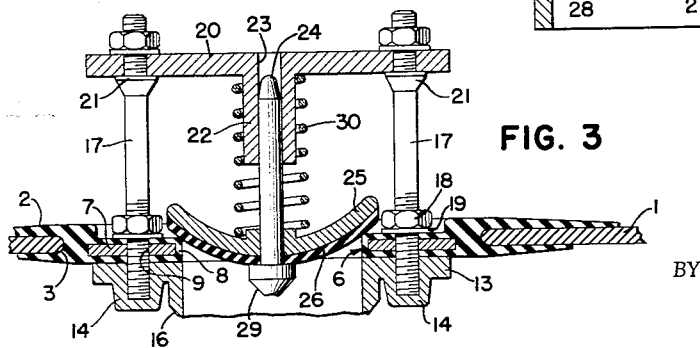
Figure 4:
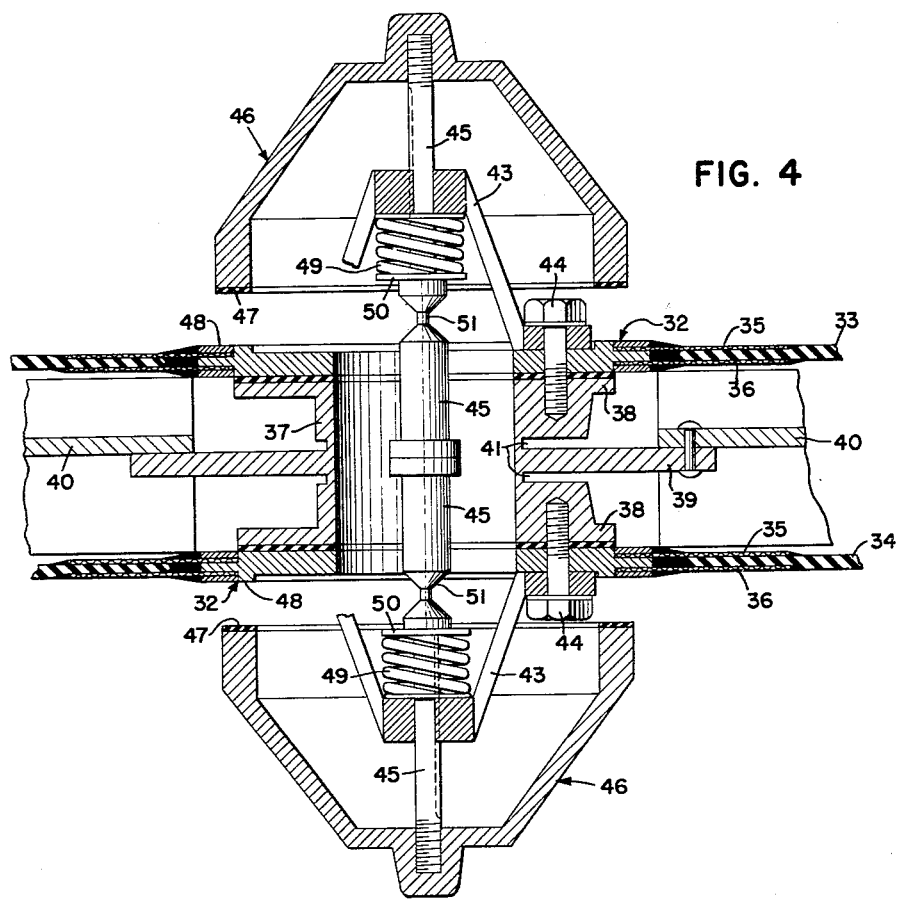
Figure 5:
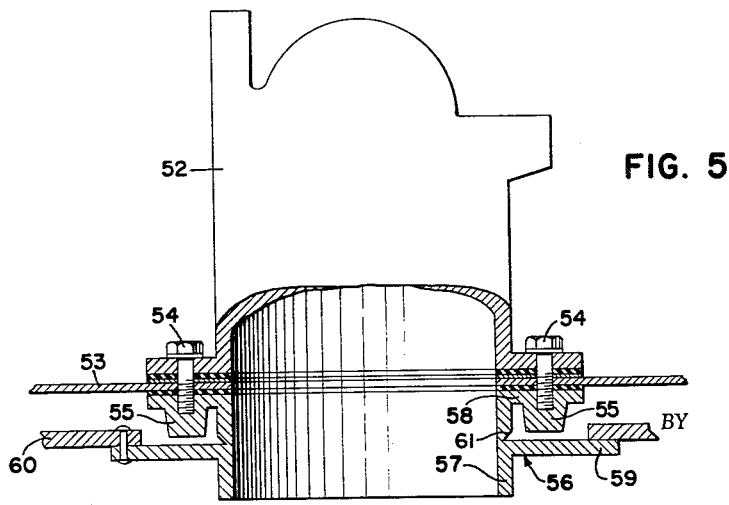

In the drawings:
FIG. 1 is a plan view of a typical fitting;
FIG. 2 is a sectional elevation of the fitting shown in FIG. 1 in the open position;
FIG. 3 is a partial sectional elevation of the fitting in the closed position;
FIG. 4 is a sectional elevation of another fitting of the invention; and
FIG. 5 is a second modification of the invention.

Several typical forms of the fitting have been illustrated in the drawings and will be described. Each fitting includes at least one area which is frangible so that it will fracture at a predetermined impact or stress and preferably is made of a lightweight, high strength material such as magnesium, aluminum, etc. The frangible area is designed so that it will withstand the normal stresses encountered but is of considerably less strength than the remaining portions of the fitting and its attachment to the supporting structure. At the time the fracture takes place, the fitting and resultingly the container, are released from their attachment to the supporting structure. Preferably, the fittings of this invention are constructed so as to be interchangeable with the fittings heretofore used with such containers. Simultaneously, the opening of the container is closed either by the particular attachment of the fitting such as a pump, or separate closure means are activated simultaneously to close the opening so that fluid in the container cannot escape. As illustrated, the separate closure means includes on the interior of the container, a valve normally held open against a compression spring but upon the fracture of the frangible area, the compression spring moves the valve against the valve seat and maintains it in this position. In the preferred forms of the invention, the closure means lies in the container interior so that the possibility of the fitting snagging or catching is minimized if the container is released from its supporting structure.

In FIGS. 1 and 2 a fuel cell wall 1 includes the usual fitting 2 attached to the periphery of the opening 3 as shown by flanges 4 and 5 of a rubber or rubber-like material to define the opening 6 in the cell wall. For the purposes of illustration, a reinforcement ring 7 is surrounded by a layer of rubber or rubber-like resilient material 8 and a series of spaced openings 9 formed therethrough.

To this fitting is attached a collar fitting 10 as shown which includes the cylindrical portion 11 with an outwardly extending flange 12 intermediate the length of the cylindrical portion 11. On the container end of the cylindrical portion 11 a flange portion 13 is formed having dome nut bosses 14 formed on the periphery thereof to register with the openings 9 in the fitting attached to the fuel cell wall. This dome nut ring and method of attaching to the fitting 2 is in accordance with well-known procedures in the fuel tank art. Each of the dome nut bosses 14 includes a threaded opening extending therein to receive a threaded member. The flange 12 is fastened to the rigid supporting structure 15 by means of rivets or other fastening means. Immediately above the flange 12 so as to lie between the flange 12 and the dome nut ring flange 13 is formed a notch 16 which provides a breakaway or frangible area on the fitting whose function will be described later.

Attached to the dome nut ring are, as shown, three supporting elements 17 which extend interiorly of the fuel cell and are locked in the position on the fitting by means of nuts 18 and lock washers 19. On the upper end of these supporting elements 17 is positioned a web member 20 engaging, as shown, shoulder portions 21 on the supporting elements 17. The web member has a cylindrical portion 22 extending toward the opening and centrally therefrom with an opening 23 therethrough. A pin 24 is slidably mounted in the opening 23 for free movement in the opening. Attached intermediate the pin 24 is the valve 25 with a resilient face 26 to form an effective seal when in register with the fitting 2 to seal the opening 6 of the fitting. The lower end of the pin 24 normally engages a stop plate 27 which rests on the inwardly extending shoulder 28 of the cylindrical member 11. Between the valve 25 and the stop 27 a notch 29 is formed to provide a frangible area in the pin. Between the web member 20 and the valve 25 a compression spring 30 is held under compression by the stop 27 supporting the end of the pin 24 which holds the valve 25 in spaced relation to the fitting opening 6.

If the tank is subjected to a high impact or stress load such as those encountered in a crash, the collar fitting 10 will fracture at the notch 16 which, in turn, frees the container from its attachment to the supporting structure 15. As the container is released, the pin 24 is disengaged from the stop 27 to cause the compression spring 30 to force the resilient face 26 of the valve 25 against the periphery of the opening 6 of the fitting, thus sealing off the opening and preventing the contents of the container from escaping therethrough.

With the valve 25 closed, the end 31 of the pin 24 projects beyond the container wall but contact of any significance of the pin with another object will fracture the pin at the notch 29 to remove the projecting portion, thus minimizing the possibility of snagging or catching the pin to pull or tear the fitting from the container.

In the modification shown in FIG. 4, a typical container interconnector fitting is illustrated in which similar fittings 32 are attached to the openings in containers 33 and 34 by means of flanges 35 and 36 in the usual manner to define the opening in the container walls. To these fittings is attached a tubular interconnector fitting 37 which has an outwardly extending dome nut flange 38 on each end thereof and an intermediately outwardly extending flange 39 for attaching the fitting to the rigid supporting structure 40. In the wall of the interconnector fitting 37 a notch 41 is formed on either side of the intermediate flange 39 to provide a frangible or breakaway area in the fitting. On the interior of containers 33 and 34, a tripod supporting structure 43 is mounted by bolts 44 which pass through the fittings 32 into the dome nut portions of the flanges 38 of the fitting 37. Extending through the central portion of the upper end of each tripod supporting structure 43 is a pin 45 slidably mounted therein. On the innermost end of the pin 45 is attached a cup-shaped valve 46 with the outer peripheral portion 47 arranged to engage the surface 48 of fitting 32 and create a seal therebetween. The surface of the valve 46 may have, if desired, a layer of resilient material thereon to assist in forming an effective seal. A compression spring 49 is mounted on the pin 45 between the shoulder 50 and the tripod member 43. The ends of the pins 45 in the fittings 37 attached to the liquid containers 33 and 34 abut each other intermediate the cells approximately in line with the attachment flange 39. A peripheral notch 51 is formed in each pin between the spring and the end thereof to provide a frangible area which will easily fracture to remove the projecting portion after release of the container from the supporting structure.

The abutment of the pins maintains the valves 46 in the open position so that the fluid in the containers can pass through the fitting from one container to the other. In the event that the container is subjected to a high impact or stress condition, the fitting will fracture at either or both of the notches 41 which will release either or both containers from their attachment to the rigid supporting structure 40. Immediately, the spring 49 snaps the valve 46 into engagement with the surface of the fitting 32 to close the opening. It is not necessary that both frangible areas be fractured in order to have both valves close, but both will close if either frangible area is fractured, which, since the release of the container from the supporting structure will disengage the pins from each other and release the compression in the springs 49 so that the valves close.

In FIG. 5, a still different form of the fitting of this invention is illustrated in which a pump 52 is attached to the container 53 by means of bolts 54 passing through spaced openings in the container wall and engaging threaded dome nuts 55 in the fitting 56. The fitting 56 includes the cylindrical portion 57 with the dome nut flange 58 and the flange 59 by means of which the fitting is firmly attached to the rigid supporting structure 60. Between the flanges 58 and 59 a notch 61 is formed to provide the frangible or breakaway area. In the event the container is subjected to high stress or impact, the fitting fractures at the notch 61 which releases the container 53 from the supporting structure 60. In this particular fitting, the pump or other similar attachment in and of itself does not permit the free flow of the fluid in the container therethrough so that it forms the closure member for the opening.

It is readily apparent that the particular closure means illustrated are representative constructions and that they may be used interchangeably in other fittings. The closure means of FIG. 4 may be used in a fitting such as illustrated in FIGS. 1, 2 and 3 and vice versa. The valves and seats may be of any desired construction and those shown are illustrative only.

In operation, the high stress or impact produced by a crash for example, will fracture the frangible area so that the container is released from the supporting structure. This, simultaneously, either causes the spring to move the valve against the seat to seal the opening or the particular attachment itself on the fitting will not permit the fluid to flow through the opening.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. A fitting for use in combination with an opening in a crash-resistant, flexible liquid container mounted in a rigid supporting structure comprising a body member having an opening therethrough connecting with the interior of the container and the exterior of said supporting structure, means to attach said body member in sealed relationship to the wall of said container around the opening with the openings in said container and body member being aligned, a rigid member on said body member for attachment to said supporting structure to fix the position of the container opening with respect to the supporting structure, a frangible area in said body member between the supporting structure and container, said frangible area being of less strength than the remainder of the body member and of sufficient strength to withstand normal stress but will fracture at a predetermined abnormal stress, and closure means engaging a portion of the body member adjacent the container to close the opening through the body member when the frangible area is fractured to release the container from its attachment to the supporting structure and to prevent the flow of fluid from the interior of the container.

2. A fitting for use in combination with an opening in a crash-resistant flexible liquid container mounted in a rigid supporting structure comprising a body member having an opening therethrough connecting with the interior of the container and the exterior of said supporting structure, means to attach said body member in sealed relationship to the wall of said container around the opening with the openings in said container and body member being aligned, a rigid member on said body member for attachment to said supporting structure to fix the position of the container opening with respect to the supporting structure, a frangible area in said body member between the supporting structure and container, said frangible area being of less strength than the remainder of the body member and of sufficient strength to withstand normal stress but will fracture at a predetermined abnormal stress, and valve means contacting a portion of the body member adjacent the container to close the opening through said body member when the frangible area is fractured to release the container from its attachment to the supporting structure and to prevent the flow of fluid from the interior of the container.

3. A fitting for use in combination with an opening in a crash-resistant flexible liquid container mounted in a rigid supporting structure comprising a body member having an opening therethrough connecting with the interior of the container and the exterior of said supporting structure, means to attach said body member in sealing relationship to the wall of said container around the opening with the openings in said container and body member being aligned, a rigid member on said body member for attachment to said supporting structure to fix the position of the container opening with respect to the supporting structure, a frangible area in said body member between the supporting structure and container, said frangible area being of less strength than the remainder of the body member and of sufficient strength to withstand normal stress but will fracture at a predetermined abnormal stress, and closure means activated when the frangible area is fractured contacting a portion of the body member adjacent the container to close the opening through the body member to prevent the flow of liquid from the interior of the container through the opening when the container is released from its attachment to the supporting structure.

4. A fitting as claimed in claim 3 in which said closure means comprises an open supporting structure attached to the container extending interiorly thereof and straddling the opening, valve means mounted on said structure substantially centrally over said opening, a valve seat surrounding said opening, stop means engaging said valve means to maintain it normally out of engagement with said valve seat, the fracturing of said frangible area disengaging said stop, and means to urge said valve means into sealing engagement with said valve seat when said stop means is disengaged whereby the valve means firmly engages said seat to close said opening.

5. A fitting for use in combination with an opening in a crash-resistant, flexible liquid container mounted in a rigid supporting structure comprising a body member having an opening therethrough connecting with the interior of the container and the exterior of said supporting structure, means to attach said body member in sealed relationship to the wall of said container around the opening with the openings in said container and body member being aligned, a rigid member on said body member for attachment to said supporting structure to fix the position of the container opening with respect to the supporting structure, a frangible area in said body member between the supporting structure and container, said frangible area being of less strength than the remainder of the body member and of sufficient strength to withstand normal stress but will fracture at a predetermined abnormal stress, and valve means interiorly of said container attached to said body member, said valve means normally being open but activated to close said opening through said body member by the fracturing of said frangible area to prevent the fluid from passing therethrough and release the container from the supporting structure.

6. A fitting as claimed in claim 3 in which said closure means comprises an open supporting structure to permit the passage of fluid therethrough attached to the periphery of the opening in said container and extending therein, a guide pin mounted centrally of said structure for longitudinal movement, a valve seat surrounding said opening on the interior of said container, valve means attached to said pin, a stop element positioning said pin to maintain said valve means normally out of engagement with said valve seat, said stop element being disengaged when the frangible area of said fitting is fractured, and a compression spring on said pin and bearing against said open supporting structure to urge said valve means into contact with said valve seat when the stop element is disengaged from said pin whereby the container opening is sealed to prevent the fluid in the container from passing therethrough.

7. A fitting as claimed in claim 3 in which said closure means comprises an open supporting structure to permit the passage of fluid therethrough attached to the periphery of the opening in said container and extending therein, a guide pin mounted centrally of said structure for longitudinal movement and extending outwardly of said container wall, a frangible area on said pin in the region adjacent the interior wall of said container, a valve seat surrounding said opening on the interior of said container, valve means attached to said pin, a stop element mounted in said supporting structure to engage and position said pin to maintain said valve means normally out of engagement with said valve seat, said stop element being disengaged when the frangible area of said fitting is fractured, and a compression spring on said pin and bearing against said supporting structure to urge said valve means into contact with said valve seat when the stop element is disengaged from said pin whereby the container opening is sealed to prevent the fluid in the container from passing therethrough, the fracturing of the frangible area of the rigid element releasing the container from the supporting structure and the frangible area of said pin fracturing to remove the projecting portion of the pin if contacted after the container is released.

8. In an aircraft structure having flexible fuel containers which are positioned in a rigid supporting structure and fastened thereto by fittings attached to the openings in the container with the fittings constructed to be released from the supporting structure under high impacts or stresses to free the container from the supporting structure and aircraft and simultaneously close the container openings to prevent loss of contents, the improvement comprising a fitting having a body member including an opening therethrough connecting with the interior of the container and the exterior of said supporting structure, and means to attach to said container and said supporting structure, a frangible area between said attaching means of less strength than the remainder of the body member and of sufficient strength to remain intact under normal stress but will fracture under abnormal stress, and closure means interiorly of said container engaging and closing the opening when the frangible area is fractured.

9. In an aircraft structure having flexible fuel containers which are positioned in a rigid supporting structure and fastened thereto by fittings attached to the openings in the container with the fittings constructed to be released from the supporting structure under high impacts or stresses to free the container from the supporting structure and aircraft and simultaneously close the container openings to prevent loss of contents, the improvement comprising a fitting having a body member including an opening therethrough connecting with the interior of the container and the exterior of said supporting structure, and means to attach to said container and said supporting structure, a frangible area between said attaching means of less strength than the remainder of the body member and of sufficient strength to remain intact under normal stress but will fracture under abnormal stress, and valve means activated when the frangible area is fractured to close the container opening.

10. A pair of flexible fuel containers mounted in a surrounding rigid supporting structure each having an opening therein oppositely disposed to the opening in the other container and a fitting attached to each opening and forming a passageway between the containers, means to attach said fitting to the portion of the supporting structure intermediate the containers, a frangible area in said fitting on each side of the supporting structure and between it and the container, each frangible area being of less strength than the remainder of the fitting and of sufficient strength to remain intact under normal stress but will fracture under abnormal stresses, and closure means in each container adjacent the opening therein activated to engage the fitting to seal the passageway between the respective container openings when either frangible area is fractured and release the container from its attachment to the supporting structure.

11. A fitting as claimed in claim 10 in which each closure member comprises an open supporting structure to permit the passage of fluid therethrough attached to the periphery of the opening in said container and extending therein, a guide pin mounted centrally of said structure for longitudinal movement, a valve seat surrounding said opening on the interior of said container, valve means attached to said pin and a compression spring on said pin bearing against said supporting structure to urge said valve means into contact with said valve seat when the closure means is activated, the pins of the closure means in each container abutting each other intermediate the containers to hold the valve means out of engagement with said valve seat but are disengaged when either frangible area is fractured thus causing the spring to urge the valve means of each closure means into contact with the valve seat to close each container opening.

References Cited in the file of this patent

UNITED STATES PATENTS

| | | |
|---|---|---|
| 166,216 | Mullowny et al. | Aug. 3, 1875 |
| 310,490 | Atwood et al. | Jan. 6, 1885 |
| 1,924,356 | Glab | Aug. 29, 1933 |
| 2,048,388 | Johnsen | July 21, 1936 |
| 2,395,802 | Bramson | Mar. 5, 1946 |
| 2,678,799 | St. Clair | May 18, 1954 |
| 2,740,418 | Pankratz | Apr. 3, 1956 |
| 2,898,926 | Tsiguloff | Aug. 11, 1959 |

FOREIGN PATENTS

| | | |
|---|---|---|
| 209,821 | Great Britain | Jan. 17, 1924 |